United States Patent
Thierbach et al.

(10) Patent No.: US 7,805,989 B2
(45) Date of Patent: Oct. 5, 2010

(54) PRESSURE TUBE FOR A POSITION MEASURING SYSTEM

(75) Inventors: Peter Thierbach, Ludwigsburg (DE); Werner Steprath, Dormagen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 12/053,119

(22) Filed: Mar. 21, 2008

(65) Prior Publication Data

US 2008/0236272 A1  Oct. 2, 2008

(30) Foreign Application Priority Data

Mar. 27, 2007  (DE) .................. 10 2007 014 559

(51) Int. Cl.
*G01M 19/00* (2006.01)
(52) U.S. Cl. ..................................... 73/168
(58) Field of Classification Search .............. 73/168; 137/625.26
See application file for complete search history.

(56) References Cited

U.S. PATENT DOCUMENTS

| | | | |
|---|---|---|---|
| 4,096,760 A * | 6/1978 | Bilbert et al. ............. 73/738 |
| 6,605,940 B1 | 8/2003 | Tabrizi et al. | |
| 6,799,746 B2 * | 10/2004 | Schafer ................. 251/129.07 |
| 2003/0080305 A1 * | 5/2003 | Schafer ................. 251/129.07 |
| 2005/0189510 A1 * | 9/2005 | Golovatai-Schmidt et al. ... 251/129.15 |
| 2007/0062588 A1 * | 3/2007 | Golovatai-Schmidt et al. ... 137/625.26 |

FOREIGN PATENT DOCUMENTS

DE   197 07 587   8/1998

\* cited by examiner

*Primary Examiner*—Andre J Allen
(74) *Attorney, Agent, or Firm*—Leydig, Voit & Mayer, Ltd.

(57) ABSTRACT

A position measuring system, especially for hydraulic valve, having a pressure tube to accommodate an armature is provided, whereby the pressure tube is manufactured by deep-drawing. As a result, a cost-effective manufacturing process can be employed for the pressure tube. The pressure tube can be firmly attached to a valve housing by means of a holding element and, optionally, an attachment flange.

21 Claims, 3 Drawing Sheets

PRESSURE TUBE FOR A POSITION MEASURING SYSTEM

Priority is claimed to German Patent Application No. DE 10 2007 014 559.6, filed on Mar. 27, 2007, the entire disclosure of which is incorporated by reference herein.

The present invention relates to pressure tube for a position measuring system, especially for a hydraulic valve.

BACKGROUND

German document DE 197 07 587 B4 discloses an electromagnetic control element with a pole tube which contains an armature that can be actuated by means of a solenoid coil, and comprising a pressure tube into which a ferrite core has been inserted. The position of the ferrite core relative to the pressure tube can be picked up by means of measuring coils provided along the outer circumference of the pressure tube. The pressure tube has a thickened flange that is joined to a magnetically conductive part of the pole tube by rolling it at an attachment site. In the state of the art, such pressure tubes are often manufactured by lathing a blank.

As an alternative to manufacturing the lathed part from a blank, it can be configured as a tube and sealed using a soldering or welding technique. For instance, U.S. Pat. No. 6,605,940 B1 discloses a tube that accommodates an armature, whereby the axial end of this tube is sealed off by a plug.

SUMMARY OF THE INVENTION

The production of pressure a tube according to the state of the art is laborious and expensive.

An object of the present invention is to provide a pressure tube that can be manufactured by means of a cost-effective process and that is suitable for high pressures.

According to the invention, a position measuring system, especially for a hydraulic valve, having a pressure tube to accommodate an armature is provided, whereby the pressure tube is produced by deep-drawing. As a result, a cost-effective process can be employed to manufacture the pressure tube.

The pressure tube preferably has a tube section and a flange section adjacent to the tube section. The attachment to the valve housing can be made via the flange section, so that a firm and pressure-tight installation is possible.

In one embodiment, the tube section is configured so as to conically widen at least along a partial section leading to the flange section, so that it can be more easily removed from the shaping tool.

The position measuring system also has a holding element in which the flange section of the pressure tube is held. This makes it possible to dispense with cutouts in the flange section of the pressure tube, while also ensuring a firm mounting of the pressure tube on the valve housing.

The tube section is held in a cutout of the holding element by means of a press fit. This ensures a centered and right-angled mounting of the pressure tube via the holding element. The conical shape of the pressure tube makes it easier to press it in.

The flange section of the pressure tube can be pressed into the holding element, so that no additional attachment device is needed between the holding element and the pressure tube.

It is also preferred for the flange section to be limited by an edge that is bent around during the pressing into the holding element. In this manner, the flange section is attached to the holding element and a centered attachment of the pressure tube can be achieved while the tube section of the pressure tube is concurrently attached to the holding element. This also enhances the strength of the connection.

In another embodiment, a sealing ring is provided between the flange section and the holding element. The sealing ring is preferably an O-ring, so that the costs incurred for the sealing are low.

In another variant of the position measuring system, the holding element is provided with a thread for installation on the hydraulic valve. This eliminates the need for additional attachment elements on the holding element, creating a space-saving position measuring system.

In another embodiment, the holding element is provided with a cutout for attachment means for purposes of installation on the hydraulic valve. As a result, the pressure tube can be attached to a valve housing by means of the holding element.

It is likewise preferred for the pressure tube to have an attachment flange that radially surrounds the pressure tube for purposes of installation on the hydraulic valve. Consequently, the holding element can be employed to effectuate a centered and right-angled mounting of the pressure tube and the attachment can be made by means of the attachment flange that has been configured specially for this purpose.

In this context, the attachment flange is preferably affixed to the holding element by means of a press fit, so that the position is fixed between the pressure tube and the attachment flange.

It is advantageous for the pressure tube to be made of non-magnetic steel since this makes it possible to implement a mechanically firm position measuring system and the influence exerted by the pressure tube on the measuring system is low.

Moreover, a pressure tube is provided for a position measuring system in which the pressure tube is made by deep-drawing. Such a pressure tube can be manufactured cost-effectively.

BRIEF DESCRIPTION OF THE DRAWINGS

The present invention will be described below with reference to schematic drawings. These show the following.

DETAILED DESCRIPTION

Figure 1:
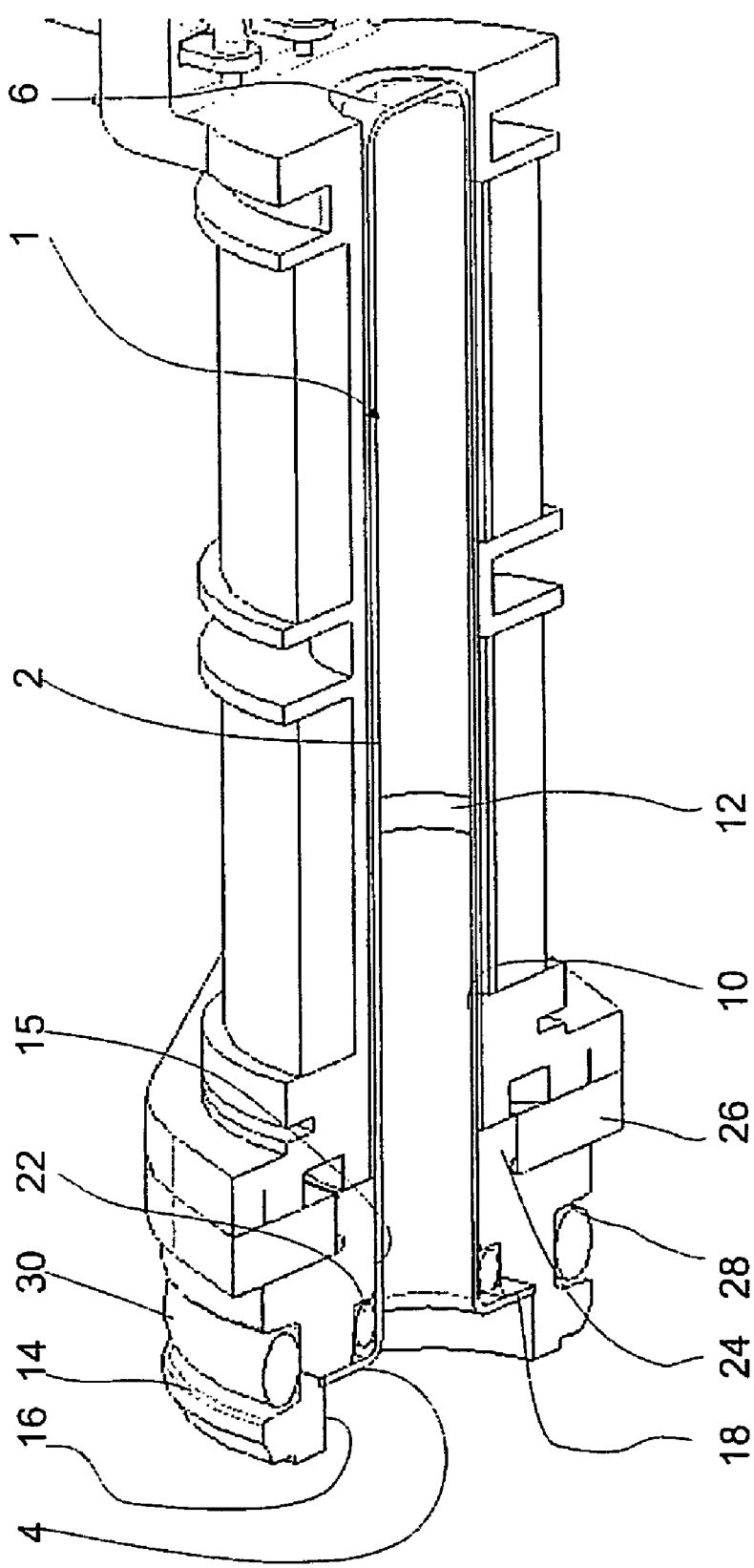
FIG. 1—a perspective sectional view of a pressure tube corresponding to the first embodiment and provided with a holding element, an attachment flange and a coil carrier.
Figure 2:
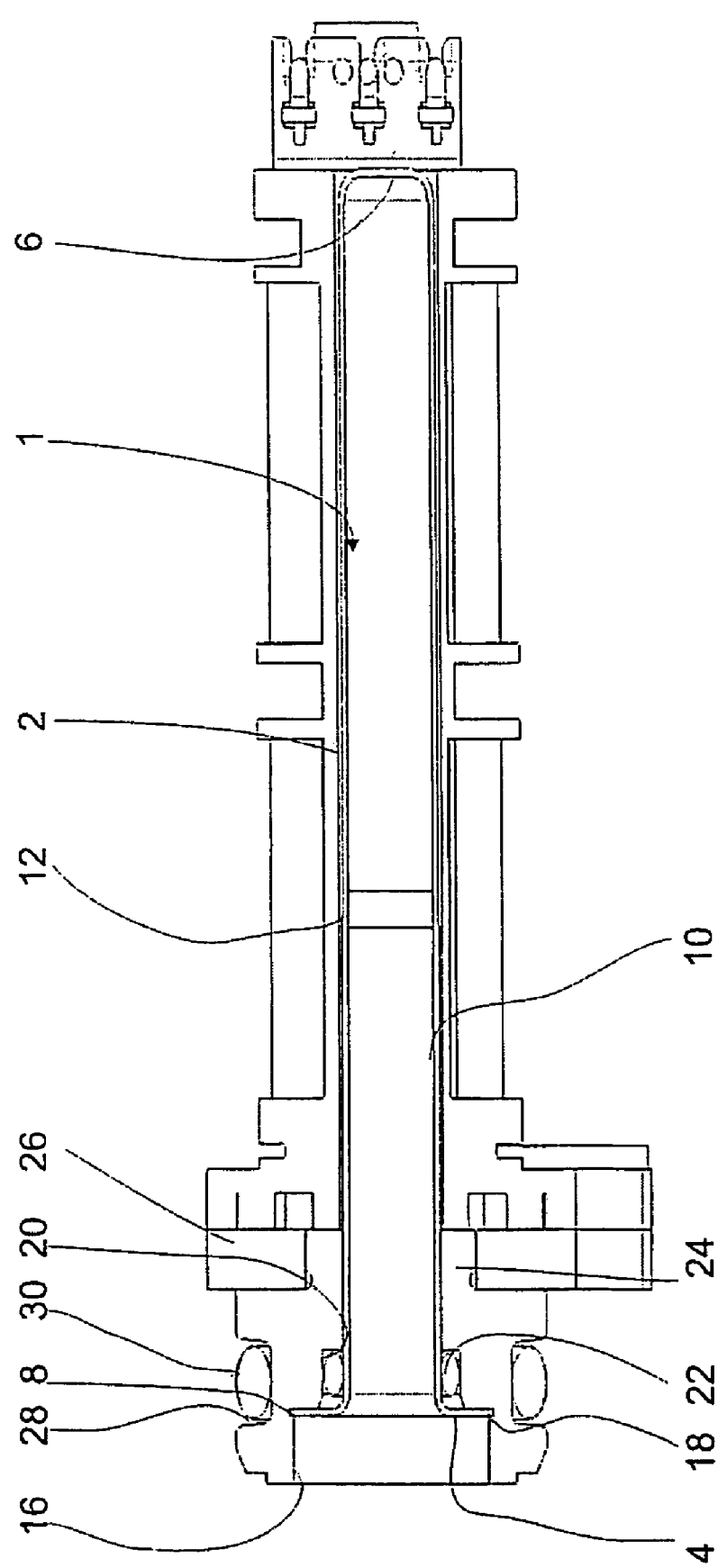
FIG. 2—a sectional view of the pressure tube according to FIG. 1.

The sectional views of FIGS. 1 and 2 show a pressure tube 1 that can be affixed to a valve housing, for instance, of a proportional valve, or to an actuation system of such a proportional valve, and that forms part of a position measuring system by means of which the position of an armature arranged in the pressure tube relative to the pressure tube can be detected by means of an appropriate electronic evaluation unit. The pressure tube is made of non-magnetic, for example, austenitic steel.

The pressure tube 1 has a tube section 2 whose one axial end section is followed by a flange section 4 and whose other axial end is closed off by a face section 6 formed in a single piece together with the tube section 2. The face section 6 is formed with the tube section 2 essentially without the formation of any edges. The flange section has an outer rim 8 (shown in FIG. 2) that runs concentrically to the mid-axis of the tube section 2.

The tube section 2 has a constant diameter starting at the face section 6 and extending to a transition area 12 situated at a distance from the face section 6 that is more than half the lengthwise dimension of the pressure tube 1, whereas said tube section 2 has a conical widening 10 from the transition area 12 to the flange section 4. The transition between the conical widening 10 and the flange section 4 is created essentially without the formation of any edges.

Owing to the above-mentioned configuration of the pressure tube 1, it can be advantageously produced by means of the deep-drawing method. Thanks to the flange that is present, the blank holder of the shaping tool can be used as a scraper, as a result of which a high number of pressure tubes can be manufactured.

The flange section 4 of the pressure tube is located in an attachment piece 14 that has a passage cutout 15 through the tube section 2. The passage cutout 15 has an annular cutout 16 whose diameter is configured slightly smaller than the outer diameter of the outer rim 8 of the flange section 4 and that is limited by an annular surface 18 shown in FIG. 2. As a result, the flange section 4 of the pressure tube 1 can be pressed into the annular cutout 16, a process in which the outer rim 8 of the flange section 4 is bent around. When the outer rim 8 of the flange section 4 is placed onto the annular surface 18, it engages with the annular cutout 16, so that the position of the pressure tube 4 is secured on the attachment piece 14. The attachment piece 14 can be a mechanical stop of the valve slide.

A recessed section 20 to accommodate an O-ring 22 is situated on the annular surface 18 of the attachment piece 14 in the direction of the mid-axis of the pressure tube 1. The pressure tube 1 that has been installed in the attachment piece 14 is sealed off vis-à-vis the attachment piece 14 by means of the O-ring 22.

An annular section 24 onto which an attachment flange 26 has been press-fit surrounds the passage cutout 15 and is formed on the end section of the attachment piece 14 opposite from the annular cutout 16.

The conical widening 10 of the pressure tube 1 is likewise press-fit into the passage cutout 15 between the recessed section 20 and the ring section 24. As a result, the pressure tube 1 is sealed off and held mechanically firmly by the attachment piece 14. Moreover, the geometrical adaptation of the pressure tube diameter in the area of the conical widening 10 and of the passage opening 15 allows a centered and right-angled mounting.

An annular cutout 28 to accommodate the O-ring 30 is formed on the outer circumference of the attachment piece 14. The attachment piece 14 is sealed off by the O-ring 30 at the valve housing (not shown in the figures).

As an alternative to the first embodiment described above, the attachment flange 26 can be dispensed with if the attachment piece 14 is provided with a thread that can be screwed into the valve housing.

With the first embodiment and its variant, a cost-effective manufacturing process can be used for the pressure tube, even for pressures in the order of magnitude of several 100 bar, a process in which inexpensive O-rings are used to create a seal.

Figure 3:
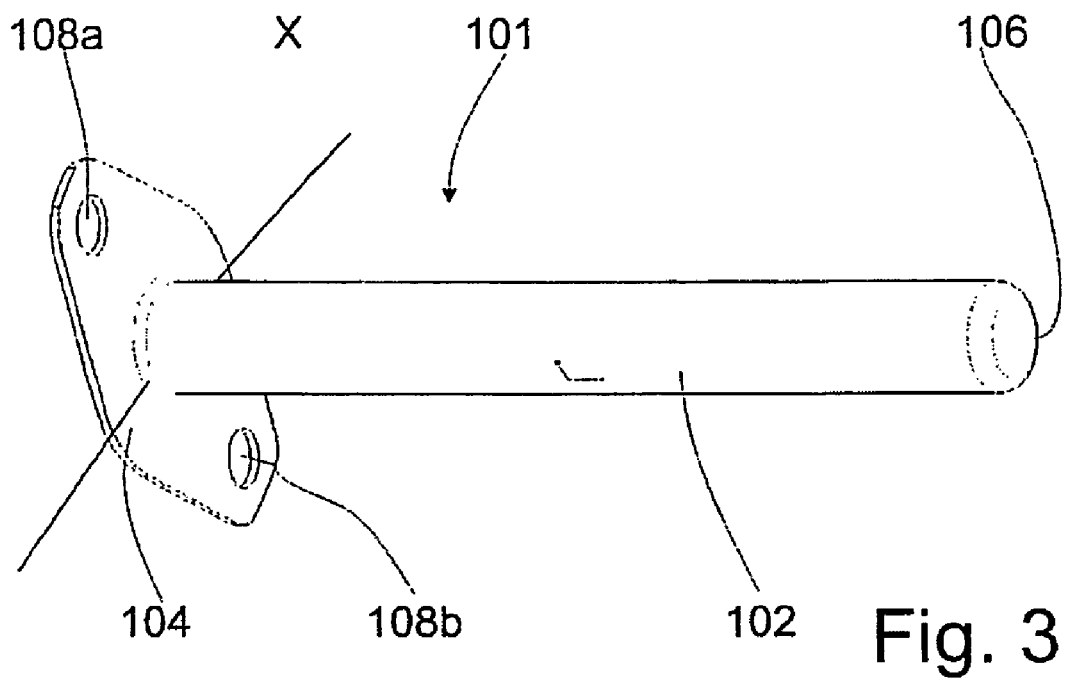
FIG. 3—a pressure tube corresponding to the second embodiment in a perspective view and in a sectional view.
Figure 4:
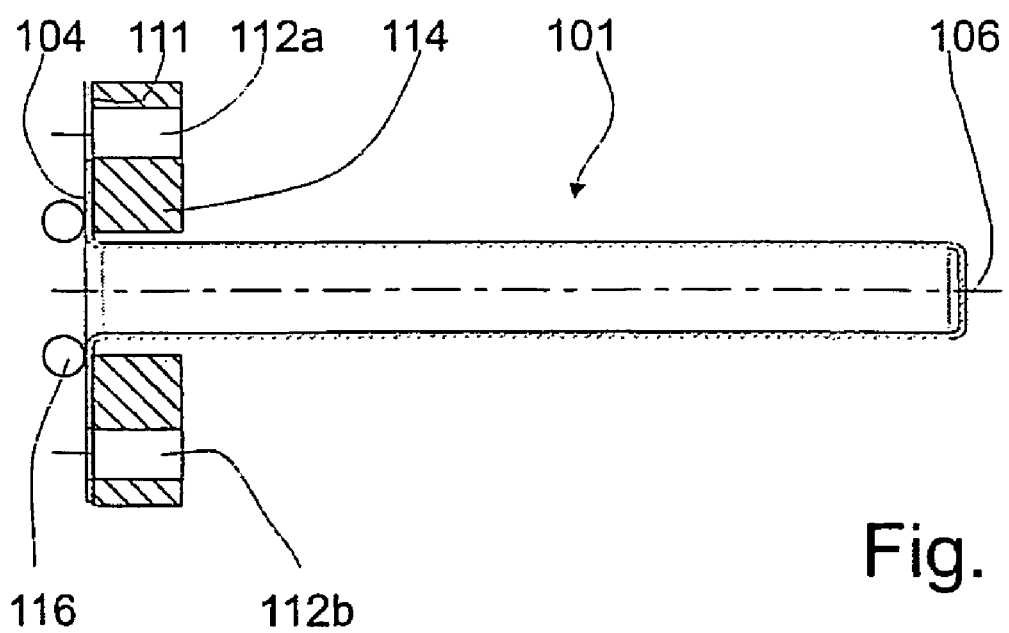
FIG. 4—a pressure tube corresponding to the second embodiment, attached to a valve housing.

FIG. 3 shows a pressure tube 101 corresponding to the second embodiment and FIG. 4 depicts the pressure tube with a holding element and a sealing ring.

The pressure tube 101 of the second embodiment, like the pressure tube 1 of the first embodiment, has a face section 106 and a tube section 102. The tube section 102 of the second embodiment has a constant diameter along its entire length in the axial direction, as a result of which it does not exhibit any conical widening. The flange section 103 is configured symmetrically with respect to an axis X that runs through the mid-axis of the tube section 102 and it has two attachment cutouts 108a, 108b.

As an alternative to this, a conical widening corresponding to that of the first embodiment can be configured in the tube section 102. This conical widening then serves only to facilitate the manufacturing process employing the deep-drawing method.

As shown in FIG. 4, an essentially annular holding element 114 can be installed on the surface of the flange section 104 facing away from the valve housing, said flange section 104 being provided with cutouts 112a, 112b associated and aligned with the attachment cutouts 108a, 108b in the flange section 104. An O-ring 116 can be provided on the segment of the flange section 104 opposite from the holding element 114 and this O-ring 116 seals off the pressure tube 101 relative to the valve housing by means of the holding element 114.

A pressure tube 101 and a holding element 114 corresponding to the second embodiment can further reduce the manufacturing and assembly effort needed for the position measuring system.

Instead of deep-drawing, other shaping methods such as, for example, external metal spinning, can be employed to make the pressure tube.

Therefore, a position measuring system, especially for hydraulic valve, having a pressure tube to accommodate an armature is provided, whereby the pressure tube is manufactured by deep-drawing. As a result, a cost-effective manufacturing process can be employed for the pressure tube. The pressure tube can be firmly attached to a valve housing by means of a holding element and, optionally, an attachment flange.

What is claimed is:

1. A position measuring system for a hydraulic valve comprising:
    an armature; and
    a pressure tube configured to accommodate the armature, wherein the pressure tube is deep-drawn, and wherein the armature is disposed relative to the pressure tube so as to enable detection of a relative position between the armature and the pressure tube.

2. The position measuring system as recited in claim 1, wherein the pressure tube has a tube section and a flange section adjacent to the tube section.

3. The position measuring system as recited in claim 2, wherein the tube section is conically widened at least along a partial section leading to the flange section.

4. The position measuring system as recited in claim 2, further comprising a holding element, the flange section being held in the holding element.

5. The position measuring system as recited in claim 4, wherein the holding element includes a cutout, and wherein the tube section is held in the cutout by a press-fit.

6. The position measuring system as recited in claim 4, wherein the flange section is pressed into the holding element.

7. The position measuring system as recited in claim 6, wherein the flange section is limited by an edge bent around during the pressing of the flange section into the holding element.

8. The position measuring system as recited in claim 6, further comprising a sealing ring disposed between the flange section and the holding element.

9. The position measuring system as recited in claim 8, wherein the sealing ring is an O-ring.

10. The position measuring system as recited in claim 4, wherein the holding element includes a thread for installation on the hydraulic valve.

11. The position measuring system as recited in claim 4, wherein the holding element includes a cutout configured for installation on the hydraulic valve.

12. The position measuring system as recited in claim 4, wherein the pressure tube has an attachment flange radially surrounding the pressure tube for installation on the hydraulic valve.

13. The position measuring system as recited in claim 12, wherein the attachment flange is affixed to the holding element by a press fit.

14. The position measuring system as recited in claim 1, wherein the pressure tube is made of non-magnetic steel.

15. The position measuring system as recited in claim 2, wherein the flange section has at least one cutout for receiving an attachment.

16. The position measuring system as recited in claim 1, wherein a front axial end of the pressure tube is closed off and a rear axial end of the pressure tube is open.

17. A position measuring system for a hydraulic valve comprising:
    an armature;
    a deep drawn pressure tube configured to accommodate the armature, the deep drawn pressure tube including an attachment flange at a rear axial end, wherein the armature is disposed relative to the pressure tube so as to enable detection of a relative position between the armature and the pressure tube; and
    a holding element, wherein the pressure tube is attachable to a housing of the hydraulic valve using the holding element and the attachment flange.

18. The position measuring system as recited in claim 17, wherein the pressure tube defines circumferential side walls, a front axial face, and an open rear axial end, and wherein the attachment flange, the circumferential side walls and the front axial face are formed as a single integral piece.

19. A method for manufacturing a position measuring system, the method comprising:
    deep drawing a metal element so as to form a pressure tube having a flange;
    providing a holding element having a cut-out opening;
    pressing the flange into the cut-out to form a press-fit between the flange and the holding element, wherein an outer edge of the flange is bent around during the pressing.

20. The method as recited in claim 19, further comprising disposing a sealing ring between the flange and the holding element.

21. A position measuring system for a hydraulic valve comprising:
    an armature; and
    a pressure tube configured to accommodate the armature, wherein the pressure tube is deep-drawn, and wherein the tube section is conically widened at least along a partial section.

* * * * *